Jan. 29, 1929.
E. J. NEY ET AL
1,700,417
HYDRAULIC POWER TRANSMITTING APPARATUS
Filed Nov. 19, 1924
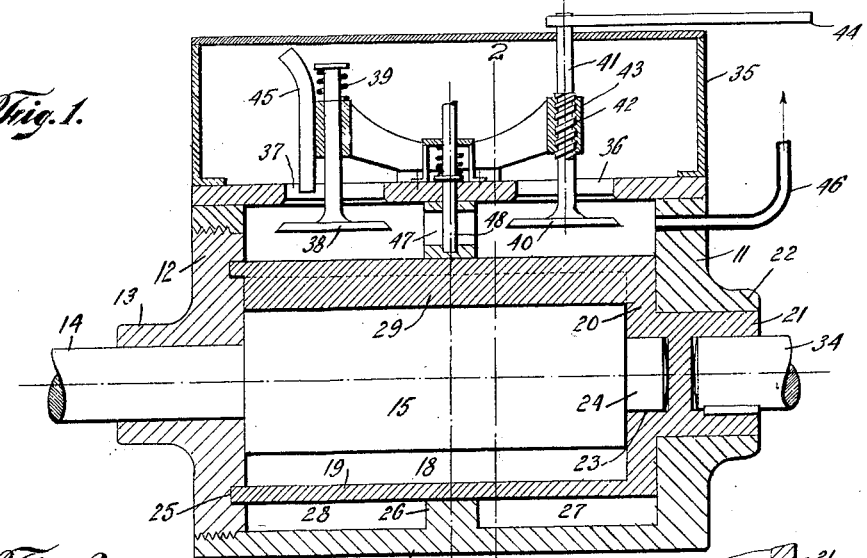

Patented Jan. 29, 1929.

1,700,417

UNITED STATES PATENT OFFICE.

EUGENE J. NEY AND MICHAEL HARTYANYI, OF NEW YORK, N. Y.; SAID HARTYANYI ASSIGNOR TO SAID NEY.

HYDRAULIC POWER-TRANSMITTING APPARATUS.

Application filed November 19, 1924. Serial No. 750,808.

The present invention relates to improvements in power transmitting devices, in which the rotation of a driving member is imparted to a driven member through the medium of a suitable fluid.

The main object of the invention is to provide a power transmitting apparatus of the type mentioned which is of great flexibility and may be easily controlled without sacrificing efficiency, and one which may be operated by an unskilled person without danger of injury to the mechanism or without liability of getting out of order.

A further object of the invention is to produce a fluid power transmitting apparatus, that is simple in construction, efficient in operation, durable in use, providing a variable-speed gear for transmitting power.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

A few of the many possible embodiments of the invention are illustrated in the accompanying drawings, in which:—

Figure 1 is a longitudinal section of a fluid power transmitting apparatus constructed in accordance with the present invention; Fig. 2 is a section taken on line 2—2 of Fig. 1; Fig. 3 is a perspective view of the driven member of the transmission; Fig. 4 is a plan view of the said driven member, in its developed state; Fig. 5 is a side elevation of the said developed driven member.

Referring now to the drawings, the numeral 10 indicates a stationary casing, including a fixed head 11 and an adjustable head 12, the latter being adapted to be shifted toward and away from the fixed head, for a purpose hereinafter to be described. On the head 12 is formed a bearing 13, in which is rotatably journaled the driving shaft 14 of the device, a cylindrical piston 15, which is disposed horizontally within the casing 10, being, preferably, made integral with the said shaft. This piston is provided with two longitudinal grooves 16, the same extending peripherally on diametrically opposite portions of the said piston throughout the length thereof. In each of these grooves is slidably disposed a vane 17, said vanes being adapted to move radially in the said grooves and each of the same being provided with bores 18, extending through the heights thereof, for a purpose hereinafter to be described. Within the casing is also rotatably mounted a cylinder 19, the piston being disposed concentrically within the said cylinder. One of the ends of the cylinder is closed by a head 20, on which is formed a journal 21 that is rotatably disposed in a bearing 22 on the casing head 11. In the head 20 and the journal 21 is formed a bearing 23 for the reduced portion 24 of the piston 15. The open end of the cylinder is rotatably mounted in an annular groove 25 in the inner face of the casing head 12. The cylinder is furthermore mounted in its central portion on a vertical partition 26, dividing the casing into two compartments, denoted by the numerals 27 and 28.

Interiorly there is formed upon the cylinder 19 a longitudinally extending rib 29, which contacts throughout its length with the piston 15. On one side of this rib is formed in the cylinder an opening 30, through which the said cylinder is adapted to communicate with the compartment 27, an opening 31 being formed on the other side of the said rib. Through the opening 31 the cylinder is adapted to communicate with the compartment 28. Adjacent one of its ends, there is formed upon the interior of the cylinder a cam face 32, and adjacent the other end of said cylinder a cam face 33. These cam faces are formed on the interior surface of said cylinder, both faces extending on both sides of the rib 29 and their highest points being coincident with the free edge of said rib 29, as clearly appears from Figs. 2 and 5 of the drawings.

Into the journal 21 extends the driven shaft 34 of the device, the said shaft being keyed to the said journal, or otherwise attached thereto.

On top of the casing 10 is mounted a reservoir 35, which is adapted to communicate with the compartments 27 and 28 of the casing through openings 36 and 37, respectively.

The opening 37 is controlled by a valve 38, disposed within the compartment 28, the said valve being under the action of a spring 39, which has a tendency to move the said valve to closing position. The opening 36 is adapted to be controlled by a valve 40, which is disposed, preferably, in the compartment 27, the said valve being adapted to be actuated by hand in any suitable manner. In the case illustrated, the stem 41 of the valve is provided with screw threads 42, in mesh with those of a stationary sleeve 43. To the said stem is attached a handle 44, which is disposed outside of the reservoir 35. By means of this handle the valve 40 may be rotated in one or the other direction, so as to open or close the opening 36 to any desired degree.

Within the reservoir 35 is located a standpipe 45, its lower end communicating with the opening 37, while its upper end is disposed adjacent the top of the said reservoir. The compartment 27 is connected by a pipe 46 with a mechanism, not shown, by which the supply of fluid, actuating the prime mover, may be automatically regulated in a manner hereinafter to be described.

The compartments 27 and 28 are adapted to communicate through an opening 47, controlled by a shutter 48 of any suitable construction.

The operation of this mechanism is as follows: The compartments 27 and 28, the cylinder 19 and the reservoir 35 are filled with a suitable liquid, for instance oil. At the beginning of the operation, the valve 38 closes the opening 37, and the valve 40 and the shutter 48 are set by hand to closing positions. When now the driving shaft 14 is rotated, the piston and the vanes on the latter move therewith, the piston revolving in the direction of the arrow shown in Fig. 2 of the drawings. Assuming that the elements are in the positions shown in Fig. 2 of the drawings, it is obvious that pressure will be generated within the cylinder in front of the lower vane 17, and suction in rear of the said lower vane. This pressure will gradually increase as the piston rotates, acting upon the front face of the rib 29 (reference being had to the position shown in Fig. 2 of the drawings), and when the pressure is high enough to overcome the load on the driven shaft 34, rotary motion will be transmitted to the cylinder 19 and the driven shaft connected therewith. It is obvious that as suction is created in rear of the moving vanes, the valve 38 is automatically brought to its opening position, whereby liquid will flow from the reservoir into the compartment 28. This liquid, on the other hand, is caused to move, through the opening 30 in the cylinder, into the compartment 27 and through the opening 36 back into the reservoir, when the valve is set to opening position, in a continuous cycle. The valve 40, which controls the opening 36 and thereby the flow of the liquid from the compartment 27 into the reservoir, may be adjusted to vary the speed of the driven member relative to the driving shaft. If this last-mentioned valve is open a very slight distance only, the speed of the driven member will approximate that of the driving member. Obviously if the opening 36 is fully closed the driven member will rotate at the speed of that of the driving member, if slippage is not taken into consideration.

The standpipe 45 is provided in order to permit ingress of air into the compartment 28 so as to make the liquid in the apparatus somewhat resilient, thereby avoiding sudden shocks. It also permits air to complement the oil in the apparatus.

The cam faces 32 and 33 serves to cause inward movement of the vanes on the piston as the latter is rotated in relation to the cylinder 19, they being moved outwardly by centrifugal force, or by springs if found necessary. The bores 18 in the vanes 17 permit fluid to flow into and from the grooves 16, thereby enabling the said vanes to move into the bores inwardly and outwardly. It is obvious that, by providing the cam surfaces, the piston is capable of being disposed concentrically within the cylinder. If these cam surfaces were absent, the piston would have to be mounted eccentrically in said cylinder, a construction which is objectionable for various reasons.

To stop the driven shaft, while the driving shaft is in motion, the shutter 48 is moved to wide open position, thereby permitting liquid to flow freely from the compartment 27 into the compartment 28. The piston will then turn freely in the cylinder without compressing liquid therein, and as a consequence rotary motion will not be imparted to the cylinder and the driven shaft.

The pressure within the compartment 27 is communicated through the pipe 46 to a mechanism for automatically regulating the supply of fluid actuating the prime motor, such as an internal combustion motor, steam engine, etc.

If the load is taken off the driven shaft 34, for instance if the power transmitting device herein described is mounted on an automobile and the latter is moving on a hill downwards, the vanes are retarded in their movement because the engine is caused to run slower by shutting off the gasoline supply. The cylinder, however, moves faster, carrying with it the driving shaft. Therefore, due to the compression in the cylinders of the said prime mover, the device acts as a brake for the rear wheels of the vehicle.

It is obvious that while herein valves and shutters of a specific type have been described, any others may be used without departing from the invention.

The head 12 of the casing 10 is made adjustable to provide a fluid-tight fit between the same and the cylinder 19; also between the piston and the head.

What we claim is:

1. A fluid power transmitting apparatus, comprising a casing divided into two compartments, a driving member, a driven member, a cylinder mounted on said driven member extending through said two compartments and provided with an interior longitudinal rib, said cylinder being provided with two openings disposed on opposite sides of said rib, the interior of said cylinder communicating through one of said openings with one of said compartments and through the other one of said openings with the other one of said compartments, a piston on said driving member concentrically arranged within said cylinder, cam faces formed upon the interior of said cylinder, vanes movable radially on said piston co-operating with the inner face of said cylinder and with said cam faces, a reservoir adapted to communicate with said two compartments, suction actuated means controlling the communication between said reservoir and one of said compartments, and manually operated means for controlling the communication between the other one of said compartments and said reservoir.

2. A fluid power transmitting apparatus, comprising a casing divided into two compartments, a driving member, a driven member, a cylinder mounted on said driven member extending through said two compartments and provided with an interior longitudinal rib, said cylinder being provided with two openings disposed on opposite sides of said rib, the interior of said cylinder communicating through one of said openings with one of said compartments and through the other one of said openings with the other one of said compartments, a piston on said driving member concentrically arranged within said cylinder, cam faces formed upon the interior of said cylinder, vanes movable radially on said piston co-operating with the inner face of said cylinder and with said cam faces, a reservoir adapted to communicate with said two compartments, suction actuated means controlling the communication between said reservoir and one of said compartments, and means for controlling the amount of fluid flowing from the other one of said casing compartments to said reservoir in a given time, thereby varying the speed of said driven member in relation to said driving member.

3. A fluid power transmitting apparatus according to claim 1, said two compartments being adapted to communicate with one another, and means for controlling said communication.

4. A fluid power transmitting apparatus according to claim 2, said two compartments being adapted to communicate with one another, and means for controlling said communication.

Signed at New York, in the county of New York and State of New York, this 10th day of November, A. D. 1924.

EUGENE J. NEY.
MICHAEL HARTYANYI.